United States Patent [19]

Takahashi

[11] Patent Number: 5,790,696
[45] Date of Patent: Aug. 4, 1998

[54] IMAGE SEGMENTATION APPARATUS AND A CHARACTER RECOGNITION APPARATUS

[75] Inventor: Hiroyasu Takahashi, Yokohama, Japan

[73] Assignee: International Business Machines Corporation, Armonk, N.Y.

[21] Appl. No.: 604,046

[22] Filed: Feb. 20, 1996

[30] Foreign Application Priority Data

Mar. 29, 1995 [JP] Japan .................................. 7-072104

[51] Int. Cl.⁶ ................................................... G06K 9/34
[52] U.S. Cl. ........................ 382/177; 382/174; 382/171; 382/289
[58] Field of Search ........................ 382/171, 174, 382/177, 287, 289

[56] References Cited

U.S. PATENT DOCUMENTS 5,563,403 10/1996 Bessho et al. .......................... 382/289
5,572,602 11/1996 Naoi et al. ............................. 382/178

*Primary Examiner*—Phuoc Tran
*Attorney, Agent, or Firm*—Robert P. Tassinari, Jr.

[57] ABSTRACT

An apparatus for separating an image from a black frame quickly and precisely wherein corner coordinates for a character field are inferred by using a parameter relative to a character frame layout, and more precise corner coordinates are detected by pel distribution in a partial range. The positions of inner walls of a black frame are then inferred by using the detected corner coordinates and the parameter relative to the character frame, and a detection area is set. The positions of the inner walls are precisely detected by the pel distribution in the detection area, and smoothing process is performed on the detected values by employing the detected values of other adjacent black frames. Sequentially, white lines are drawn along the inner walls to separate the black frame from the character, and noise is removed. In consonance with a skew value, the detection area is divided to change the set range, and data separation is performed by using two white lines with a step difference between them. Through this processing, even when a skew value is large, the position of a black frame can be precisely determined, and since scanning is performed only in a partial range, fast processing can be provided.

12 Claims, 13 Drawing Sheets

IMAGE SEGMENTATION APPARATUS AND A CHARACTER RECOGNITION APPARATUS

FIELD OF THE INVENTION

The present invention relates to an image segmentation apparatus and a character recognition apparatus, and in particular to an image segmentation apparatus that separates a character or an image from a black character frame at high speed, and to a character recognition apparatus that recognizes characters that are separated by the image segmentation apparatus.

BACKGROUND OF THE INVENTION

In the recent application of OCR (Optical Character Reading), a black character frame (hereafter referred to as a "black frame") becomes more important than a character frame that is printed with a conventional drop-out color. The main reasons 15 are: (1) the demand for FAX-OCR has increased and it is no longer rare for an OCR form to be sent by facsimile from an OCR center to an end user; (2) an OCR form having a single color, black, does not cost much; and (3) with a thick black frame, a protrusion into an adjacent character frame is easily absorbed and the interval between characters can be set so that it is smaller than the one for the drop-out frame.

In order to recognize characters with the OCR that are written inside black frames, first, preprocessing is required to separate the characters from the black frames.

Conventionally, the following process for the separation of a character from a black frame is performed. The corner coordinates of a quantized character field are inferred by employing the relative positions of a reference mark and a character field that are provided by an upper program. A histogram is calculated by accurately counting pels beginning at the corner coordinates without specifically designating a range. According to the histogram, the positions of the inner walls of the black frame, which is similar to a rectangle and which has vertical and horizontal sides, are detected. In some cases, the positions of the inner walls are detected by exactly tracing the shape of the black frame. To calculate the histogram, pels are counted vertically or horizontally along all the lines or rows of the black frame.

When the inner walls are detected, a search begins internally from the inner wall. When the character is in contact with the black frame, the character is appropriately separated from the black frame in consonance with the shapes, etc., of pels nearby.

The corner coordinate that are originally inferred are not altered even after the detection is shifted to the second line and thereafter. The corner positions of the black frame for the second line are acquired from the inferred value, and the shape of the black frame and the histogram are accurately traced. Following this, the above described process is repeated.

Usually, two types of black frames can be selected as a character field: an individual character frame (each character has an independent rectangular frame), and a table form (a character field of M rows and N columns consists of a rectangle, which is defined by black lines, of (M+1)*(N +1)). Conventionally, different algorithms are employed to perform segmentation for each of the two types of black frames.

According to the method for handling a black frame, after a black frame is removed, a conventional drop-out process is performed. From a view point for an interface at the time of error correction, both original image data for the display of an image and the image data for character segmentation are provided.

OBJECT OF THE INVENTION

The conventional technique has the following shortcomings. Since the range is not specified and pels are counted to acquire a histogram, and since in some cases the shape of a black frame is accurately traced, a long processing time is required. As the process for separating characters from the black frames also requires a long time, and as when this function for separating characters from the black frames is incorporated in a new OCR version the processing by the new version is slower than that by the old version, users will be dissatisfied with it.

Skews inevitably occurs during the reading of characters by a scanner. Since, according to the background, the shape of a black frame is similar to a rectangular that has horizontal and vertical sides, the occurrence of a skew can not be coped with and the extraction of a black frame and the accuracy of the character segmentation will be deteriorated. In addition, since pels are counted along all the rows or all the columns of black frames, or the first inferred corner coordinates are employed unchanged for the succeeding rows in order to calculate a histogram, it is more difficult to cope with non-linear skews that have different angles for each portion. If, in order to cope with skews, the positions of the black frames or the characters are traced in detail in order to obtain increased accuracy during segmentation, the processing will take much more time, which gives rise to a dilemma.

Further, since a different algorithm for separation is employed for an individual character frame and for a black frame in table form, a program for that purpose is long and its maintenance will be complex.

In addition, since both original image data for error correction of image displays and image data for character segmentation are provided, a large memory capacity is required.

To overcome the above shortcomings, it is an object of the present invention to provide a memory-saving character segmentation apparatus that in operation employs a simple algorithm, which requires so little time for character segmentation within a black frame that the processing time relative to the total processing time can be almost ignored, and that even when skews occur can accurately separate characters from black frames; and a character recognition apparatus.

SUMMARY OF THE INVENTION

To achieve the above object, according to one aspect of the invention, an image segmentation apparatus comprises: input means for inputting digital image data that include data for a character frame; parameter acquisition means for acquiring a parameter relative to the character frame; position detection means for detecting a position of the character frame in an image; inner wall inferring means for inferring positions of inner walls on four sides of the character frame by employing the position of the character frame, which is detected by the position detection means, and the parameter of the character frame; range setting means for inferring ranges for each frame segment that constitutes the character frame, and for setting partial ranges that overlap the inferred ranges by employing the positions of the inner walls of the character frame, which are inferred by the inner wall inferring means, and the parameter of the character frame; inner wall detection means for acquiring pel distribution for each of the ranges by actually scanning pels in the ranges that are determined by the range setting means, and for detecting positions of the inner walls of the character frames by employing the pel distribution; and separation means for separating the character frame and image data within the character frame by employing the positions of the inner walls, which are detected by the inner wall detection means.

According to another aspect of the invention cited in claim 2, the image segmentation apparatus further comprises smoothing means for smoothing the positions of the inner walls of the character frame, which are detected by the inner wall detection means, by employing the positions of the inner walls and positions of inner walls that are detected for another character frame that is adjacent to the character frame.

According to a further aspect of the invention, in the image segmentation apparatus or the separation means employs, as a reference, the positions of the inner walls to set a data separation frame of a predetermined width along the inner walls, and separation frame setting means rewrites image data within the data separation frame to prepare image data with a different density or in a single color phase.

According to a further aspect to the invention, in the image separation apparatus, the separation frame setting means employs two line segments of a predetermined width, which are so connected as to have a given step difference, in order to approximate the data separation frame in consonance with an obtained skew value.

According to a further aspect of the invention, the image segmentation apparatus further comprises noise removal means for removing, from the data separation frame, black pels that are retained in an inwardly extended predetermined width.

According to a further aspect of the invention cited, in the image segmentation apparatus, the range setting means varies the ranges in consonance with the obtained skew value.

According to a further aspect of the invention, in the image segmentation apparatus, the position detection means includes corner coordinate inferring means for employing the parameter relative to the character frame to infer coordinates for a corner on a row of the character frame; and corner coordinate determination means for determining, near the coordinates that are inferred by the corner coordinate inferring means, each partial range that partly includes a horizontal frame segment or a vertical frame segment that constitutes the character frame in the row, for employing pel distribution in a range including the horizontal frame segment to determine a Y coordinate for the corner on the row, and for employing pel distribution in a range including the vertical frame segment to determine an X coordinate for the corner on the row.

According to a further aspect of the invention, in the image segmentation apparatus, in an identical character field the corner coordinate inferring means employs the parameter of the character frame to infer a corner coordinates for the first line of the character frame, and employs the parameter relative to the character frame and corner coordinates that is detected for a line immediately before in order to infer corner coordinates for a second line and succeeding lines.

According to a further aspect of the invention, in the image segmentation apparatus, the inner wall detection means includes pseudo histogram preparation means, for calculating a logic product for pel values horizontally or vertically in the range, to prepare a binary pseudo histogram where vertically or horizontally an AND projection is performed on the pels in the range; and change detection means for detecting change points, for the pseudo histogram in a range near the positions of the inner walls that are inferred by the inner wall inferring means, and coordinates for the change points, which are detected by the change detection means, that are employed as coordinates for the inner walls of the character frame.

According to a further aspect of the invention, in the image segmentation apparatus, the pseudo histogram preparation means includes dividing and projecting means, for, in consonance with the obtained skew value, dividing the range into a plurality of areas in a direction perpendicular to a direction for searching and acquiring an AND projection for each of divided areas; and connection determination means, for connecting divided frame segments by employing a positional relationship of black pels that is obtained by the AND projection. A pseudo histogram can be prepared only by employing a result of the AND projection for a frame for which the connection determination means determines the frame segments are connected.

According to a further aspect of the invention, a character recognition apparatus recognizes image data for a character frame that are separated by the image segmentation apparatus.

According to a further aspect of the invention, the character recognition apparatus further comprises display means for displaying the character frame and image data within an internal area of the character frame.

According to a further aspect of the invention, when digital image data including a character frame is input by the input means, a parameter relative to the character frame is acquired by the parameter acquisition means. When the position detection means detects the position of the character frame, the inner wall inferring means infers the positions of the inner walls of the character frame by using the detected position and the parameter relative to the character frame. When the inferred values for the positions of the inner walls are acquired, the range setting means employs these values and the parameter of the character frame to set partial ranges that overlap the frame segments that constitute the character frame.

The inner wall detection means actually scans the pels in the partial ranges to obtain pel distribution in each range and to detect the positions of the inner walls of the character frame.

The separation means separates the character frame and the image data in this character frame in consonance with the detected positions of the inner walls.

Since appropriate partial ranges are determined by the inferred values obtained by the parameter relative to the character frame and the scanning is performed only in these ranges, the accuracy of detection is not degraded and required processing time can be substantially shortened.

According to a further aspect of the invention, the smoothing means smoothes the position of the inner walls, which are detected by the inner wall detection means, according to these positions and the detected positions for the inner walls of the adjacent character frames. Thus, noise and influence on character portions are reduced, and the detection of the positions of the inner walls is highly accurate.

According to a further aspect of the invention, the separation frame setting means employs the detected inner wall positions as reference data to set a data separation frame with a given width along the inner walls so as to rewrite the data separation frame area to obtain image data with a different density or with a single color phase. Through this process, even when a character contacts the character frame, character data, etc., can be precisely separated from the character frame.

According to a further aspect of the invention, the separation frame setting means performs an approximation process, with the data separation frame, that is in consonance with the obtained skew value, by using two line segments of a given length that are so connected as to have between them a predetermined step difference. Through this process, even when a skew value is great, image data can be separated from the character frame.

According to a further aspect of the invention, the noise removal means removes black pels that are placed inside of the data separation frame within an area having a predetermined width. Thus, the possibility becomes slight that part of the character frame will be separated as a character portion, and the separation can be performed accurately.

According to a further aspect of the invention, the range setting means can vary the ranges that are set in consonance with the obtained skew value. Since the range can be changed appropriately even when the skew value is large, the deterioration of the accuracy for the inner wall detection can be prevented.

According to the invention, the corner coordinate inferring means infers the coordinates for the corner on the line of a character frame according to the parameter relative to the character frame. The corner coordinate determination means allocates, near the inferred corner coordinates, partial ranges that partly include horizontal frame segments and vertical frame segments that constitute a character frame on the line, determines the Y coordinate for the corner on the line according to the pel distribution in the range that includes the horizontal frame segments, and determines its X coordinate according to the pel distribution in the range that includes the vertical frame segments. In this manner, a more accurate position for the character frame can be detected.

According to the invention in claim 8, the corner coordinate inferring means employs the parameter relative to the character frame to infer the corner coordinates for the first line of the character frame. For the second line and thereafter, the corner coordinate inferring means employs the parameter relative to the character frame and corner coordinates, which are detected for the line immediately before a target line, to infer corner coordinates for the target line. In this manner, even when there is a non-linear skew whose value differs for each line, accurate corner coordinates can be detected for each line.

According to the invention in claim 9, the pseudo histogram preparation means calculates a logic product of pels horizontally or vertically in a designated range, and prepares a binary pseudo histogram where an AND projection is performed horizontally and vertically on the pels in this range. The change detection means detects the change points in the pseudo histogram within the range near the positions of the inner walls, which are inferred by the inner wall inferring means. The inner wall detection means then outputs the coordinates of the change points as position coordinates for the inner walls of the character frame. By performing the AND projection, the time required for the preparation of the histogram can be reduced and fast processing can be provided. Degrading of the detection accuracy can be prevented by examining the changed points even during fast processing.

According to the invention in claim 10, in consonance with the skew value, the division and projection means divides the range into a plurality of areas in a direction perpendicular to the searching direction, and acquires AND projections for the divided areas of the range. The connection determination means determines the connection of the divided areas according to the positional relationship between the black pels that are obtained as the result of the AND projection. The pseudo histogram preparation means prepares a pseudo histogram by employing the result obtained by the AND projection on the frame that is determined to be connective. Through this process, since an AND projection can be performed even when a skew value is large, the fast processing can be continued and the degrading of the accuracy for the inner wall detection can be prevented by checking the connection.

According to the invention in claim 11, the character recognition apparatus recognizes image data for the character frame that are separated by the image segmentation apparatus according to the present invention. Since a character in a black frame can be separated at high speed and with high accuracy, the processing speed as a whole is not reduced and accurate character recognition can be provided.

According to the invention in claim 12, the display means displays the character frame and the image data within the character frame area. Since the image that is displayed is one in which the character frame, the character, etc., are precisely separated from each other, one image can serve as display data, and separation data and memory can be saved.

DESCRIPTION OF THE PREFERRED EMBODIMENT

Figure 1:
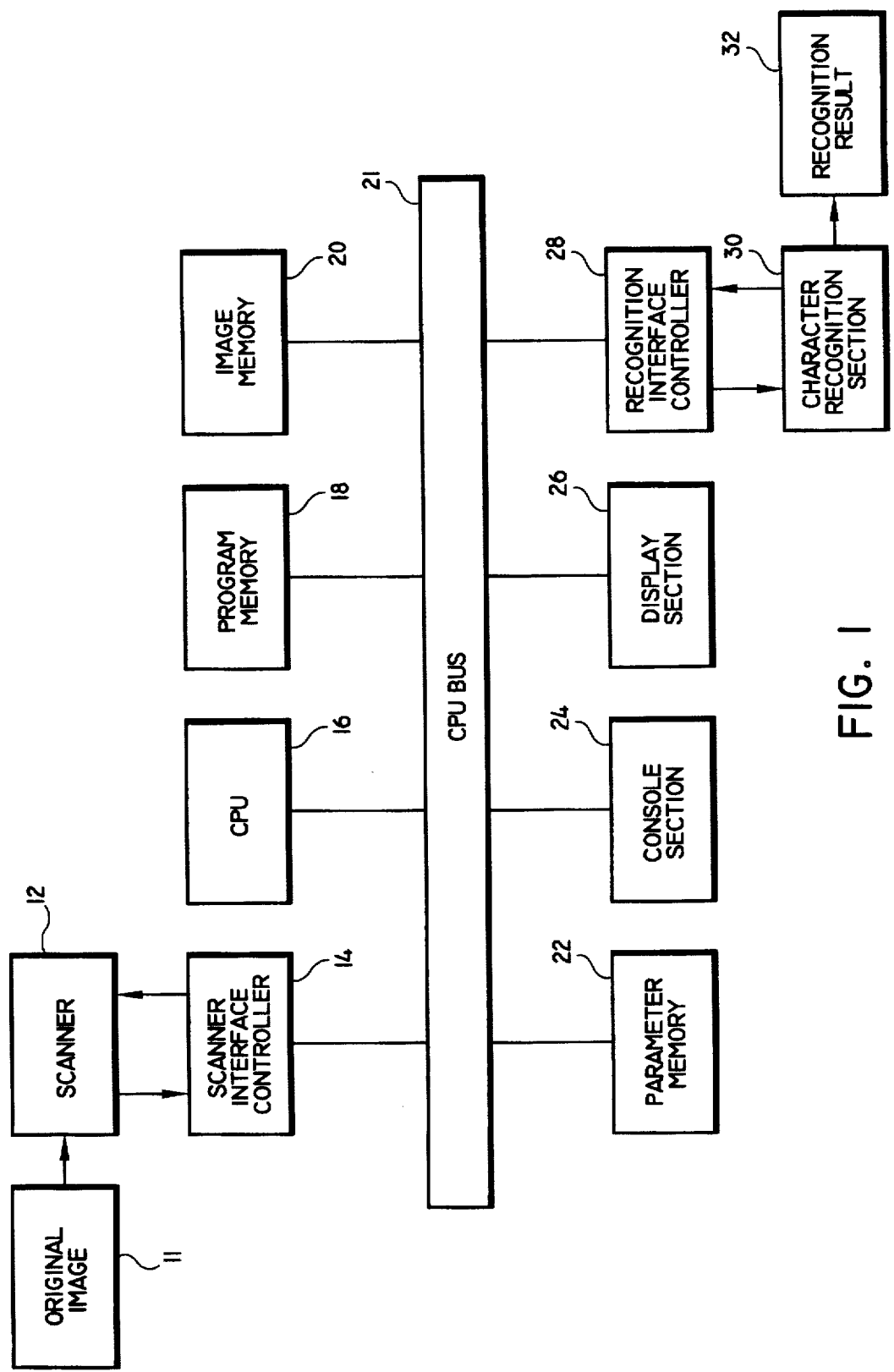
FIG. 1 is a schematic block diagram illustrating the arrangement of a character recognition apparatus according to one embodiment of the present invention.

FIG. 1 is a schematic block diagram illustrating the arrangement of a character recognition apparatus according to one embodiment of the present invention.

A scanner 12 scans paper while irradiating white light, and quantizes the intensity of the reflected light to convert an original image 11 that is on paper into digital image data.

A scanner I/F (interface) controller 14 is an interface controller that transmits control commands to the scanner 12 and forwards digital image data from the scanner 12 to a CPU bus 21.

A CPU 16 is a controller that transmits control commands to the individual sections via the CPU bus 21 in consonance with a program that is read from a program memory 18, and executes recognition processing and image separation processing.

The program memory 18 is a memory for storing a program that executes the image separation processing.

The CPU bus 21 is employed to transmit commands from the CPU 16, data output from the individual sections, and digital image data, and communicates with the CPU 16 and other components.

An image memory 20 is employed to store digital image data that are output by the scanner 12 and image data that are obtained during and after the image separation processing, which will be described later.

A parameter memory 22 is employed to store parameters that concern a character field included in the original image 11 and a character frame of the field. These parameters are, for example, a relative position for a character field with a reference mark as a standard, the size of a character frame, the thickness of the lines that constitute a character frame, a gap between character frames, and defined values, such as the number of character frames in each character field. These parameters may be acquired from data that are entered by an operator or are received from a host computer.

A console section 24 is input means by which an operator enters instructions to a character recognition section. The console section 24 is constituted by, for example, a keyboard, a touch panel, and a mouse.

A display section 26 is display means, such as a CRT, for displaying digital image data that are stored in the image memory 20 or image data for which separation frame setting processing that will be described later is performed.

A recognition I/F (interface) controller 28 transmits control commands that are received from the CPU 16 to a character recognition section 30, and outputs character data that are separated from a character frame to the character recognition section 30.

The character recognition section 30 receives commands from the CPU 16 and executes a character recognition process for input character data in consonance with an internally provided program, and outputs a recognition result 32, which is converted character code.

Figure 2:
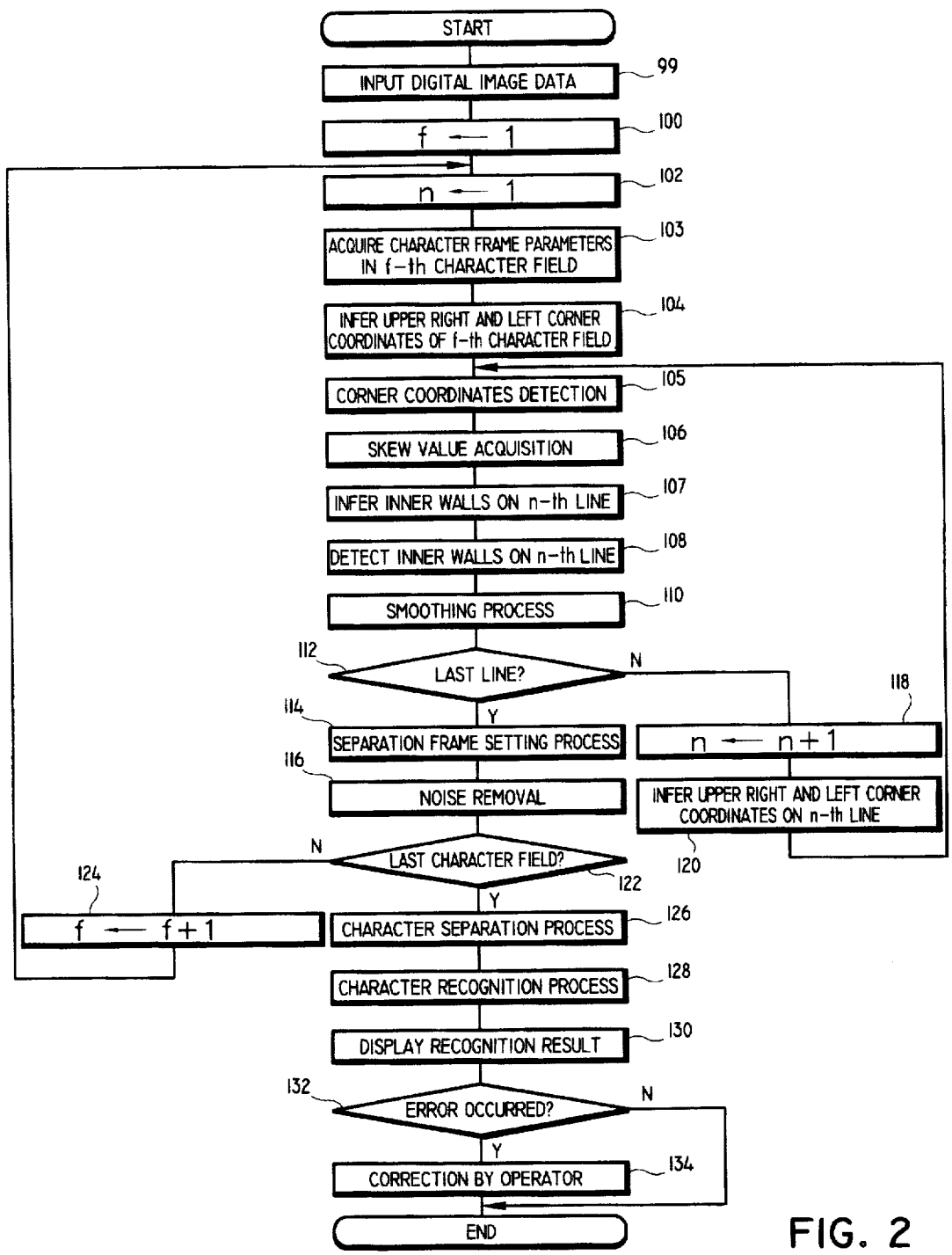
FIG. 2 is a flowchart showing the processing for the character recognition apparatus according to the embodiment of the present invention.

The processing of the character recognition apparatus according to the embodiment will now be described while referring to the flowchart in FIG. 2.

First, the scanner 12 scans paper while irradiating white light. The scanner 12 then converts the original image 11, including a character frame, into digital image data by quantizing the intensity of the reflected light, and outputs the data via the scanner I/F controller 14 (step 99). The character frame for the digital image data is called a "black frame" to distinguish it from the character frame of the original image 11.

The CPU 16 searches the character field of the received digital image data, and executes the following image separation process for separating character data within the area that is enclosed by the black frame of each character field.

A number f, indicating the procedure order for a character field that is included in the original image 11, is set to "1" (step 100). A number n, indicating the procedure order for the lines of the black frame in one character field, is set to "1" (step 102). This is done because the succeeding processing is started at the first row of the first character field.

Then, a parameter for a character frame in the f-th character field is acquired (step 103). Since f is "1", the parameter for a character frame in the first character field is obtained.

Sequentially, the coordinates of the upper left and the upper right corners in the character field are inferred (step 104). In this process, the position of the character field in the digital image data is calculated by employing the parameter, which is stored in the parameter memory 22, for the position of the character field relative to a reference mark. The coordinates for the corners are hereafter referred to simply as "corner coordinates".

Then, the corner coordinate detection process is performed to correct the inferred coordinate values so as to provide more exact values (step 105). In this process, a detection area of a predetermined range is set near the corner coordinates that are inferred at step 104 or at step 120, which will be described later, and more accurate corner coordinates are calculated from the pel distribution in the detection area.

After the corner coordinates are detected, a skew value is acquired, which indicates the degree of the skew of the black frame for this line (step 106). As to this process, there are a method for calculating a skew value by scanning an image at a predetermined range and a method for receiving a skew value that is calculated during the reading of the original image 11 by the scanner 12. The skew value that is thus obtained may be corrected by using a tilting angle that is calculated from the detected upper right and upper left corner coordinates, or by scanning a given range of a black frame.

Following this, the inner wall inferring process for the first line is performed to infer the positions of the four inner side walls that constitute the black frame on the first line (step 107). In this process, the inner walls of the black frame are supposed to form a rectangle which has a horizontal base and a perpendicular altitude. While the upper right and left corner coordinates in the character field detected at step 104 are employed as references, the corner coordinates (the X coordinate for the right and the left sides and the Y coordinate for the upper and the lower sides) of that imaginary rectangle are calculated from defined values, such as the horizontal and vertical lengths of the inner walls of the character frame, the gaps between character frames, or the thickness of the lines that constitute the character frame. It should be noted that, for this calculation, when a skew value that is obtained at step 106 is greater than a specific value, the coordinates for the central points of the individual sides of the inner walls are acquired and are assumed to be inferred values.

Since the inferred positions of the inner walls are obtained from the defined values for the character frame in the original image 11, skews and noise during the reading by the scanner 12 cause errors of several pels in these values.

When the inner wall inferring processing is terminated, an inner wall detection process is performed whereby the pel distribution in a predetermined partial range of the black frame is actually examined and the inferred values are corrected, so as to improve the accuracy of inferred values that have errors (step 108).

When the inner wall detection processing is terminated, the smoothing process is performed (step S110). As one method for the smoothing process, the inner wall detection positions for one target black frame are acquired by adding values that are obtained by multiplying the inner wall detection positions of black frames, including the target frame, by a window having an appropriate weight, and by dividing the sum by the number of the black frames including the target frame. For example, after the inner wall detection position value for one target black frame is added to the values for other adjacent black frames, the sum is divided by "3", the number of these black frames, and the resultant value is output as the inner wall detection position for the black frame. In such a case, as for a black frame at the left end or at the right end of the line, double its detected values is added to the detected values for the right or left adjacent black frame, and the resultant value is divided by "3". Through the smoothing process, the errors for the inner wall position, which are due to noise and to character strokes that are located near the frame, are reduced, a more accurate detected value can be obtained, and the accuracy for the separation of a character from the black frame can be increased. The coefficient values of a window and the selection of nearby black frames can be varied arbitrarily, and various smoothing methods other than the above described method may be employed.

After smoothing has been performed for the inner wall positions of all the black frames, a check is performed to determine whether or not the current line is the last line in the character field (step 112).

When the current line is not the last (negative result at step 112), the line number n is incremented by "1" (step 118). This means that the processing is to be performed for the succeeding line. The inferring process for the upper right and left corner coordinates for the black frame on the following line is performed (step 120). Program control thereafter returns to step 105, whereat the corner coordinates are accurately detected according to the inferred values. The same processing is performed until the last line in the character field is reached.

For the black frame on the second line or thereafter, the corner coordinates inferring method at step 120 may be replaced with a method by which, while the corner coordinates that are detected for the previous line are employed as a reference, the corner coordinates on the line may be calculated by using the parameters relative to a character frame, such as a gap between lines and the size of a character frame. In this manner, the inferred values thus obtained are more accurate than those obtained by using the relative positions with a reference mark. Further, it is possible to reduce an influence due to non-linear skew in which skew values differ depending on the image position.

When the smoothing process has been completed for the last line in the character field (affirmative result at step 112), the separation frame setting process is performed for all the black frames in the character field (step 114). In this process, while the detected inner wall positions are employed as references, a data separation frame having a predetermined width is set along the inner walls, and pels within the data separation frame are rewritten to white pels. Since the black frame and the character area are clearly separated from each other, not only is the accuracy in separation increased, but also, when this data is employed as display data, an image is easily identified.

When the separation frame setting process has been completed, the noise removal process is performed (step 116). Through this process, the black frame pieces, which have remained inside near the data separation frame during the separation frame setting process, can be removed. Therefore, errors that occur due to noise being separated as character data can be prevented.

A check is performed to determine whether or not the current character field is the last in the original image 11 (step 122). If the current character field is not the last one (negative result at step 122), the character field number f is incremented by "1" (step 124). Program control returns to step 102 to perform the separation process for the succeeding character field, and the above processing is repeated.

When the processing for all the character fields in the original image 11 has been completed (affirmative result at step 122), the image data inside the data separation frame that is designated at step 114 is separated as character data (step 126).

The CPU 16 outputs the character data that are separated at step 126 to the character recognition section 30 via the recognition I/D controller 28, and issues a command to begin the recognition process. Upon receipt of the command, the character recognition section 30 begins to evaluate the separated character data by referring to the character code in a dictionary that is prepared in advance, and outputs, as the recognition result 32, the character code that it most closely resembles (step 128). The character separation process at step 126 may be performed by the character recognition section 30. In this case, the CPU 16 does not execute the separation process and transmits the position of the data separation frame to the character recognition section 30. The character recognition section 30 then separates the image data in the data separation frame from the black frame, and executes the recognition process.

The display section 26 displays the recognition result 32 (step 130). At this time, not only the separated characters but also the black frames may be displayed together. Since, at step 114 for the separation frame setting process, the data separation frame is written with a density or color (white for binary image data) that is different from image data, the black frame and the character can be clearly separated from each other, and they can be employed as an image for error correction. As a single image can serve as both an image for display and as an image for separation, a considerable savings in space in the image memory 20 can be realized.

When there is a separation error or erroneous recognition of a displayed image (affirmative result at step 132), an operator manipulates the console section 24 and corrects the error (step 134), and terminates the processing for the original image 11. If no error is found (negative result at step 132), the processing is then terminated without performing any correction.

According to the image separation process of the character recognition apparatus, since the area for actually scanning image data is limited to only a partial range, fast processing can be provided. Further, since the inference process that is based on the character frame parameters, the image scanning in the range near the inferred values, and the smoothing process are combined and performed appropriately, the separation of the character from the black frame can be maintained with high accuracy. In addition, as the content of the processing for an individual character frame and for a table form is identical, except for a slight difference in calculation using the gaps between character frames, both cases can be uniformly processed.

The processes at steps shown in FIG. 2 will now be explained in detail.

The corner coordinate detection process at step 105 will be described in detail while referring to FIG. 3. The processing in FIG. 3 is an example processing that is performed relative to the black frame lines 312, 314, 316 in FIG. 4, and only the upper left corner coordinate detection process will be performed for convenience sake.

Figure 3:
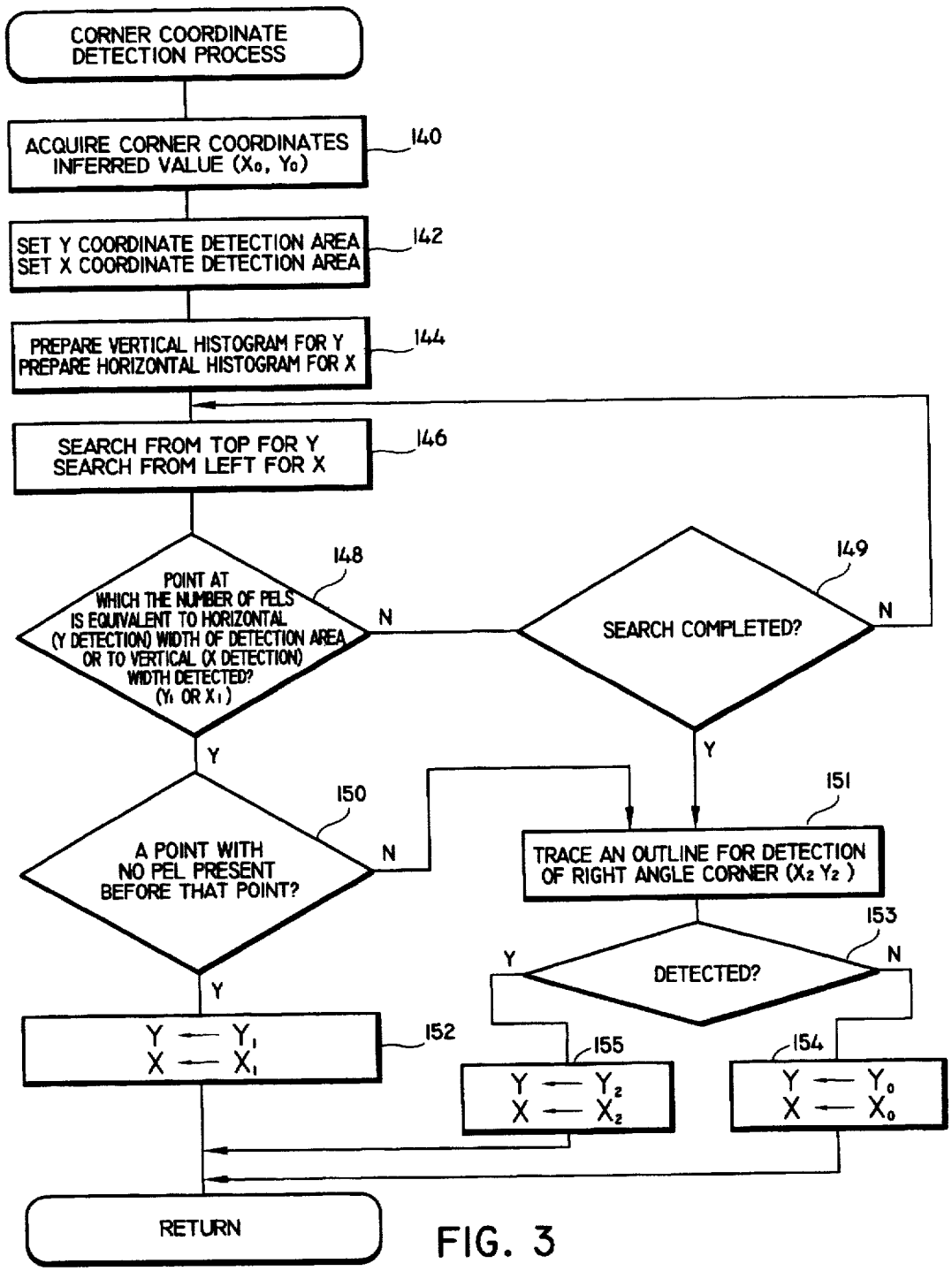
FIG. 3 is a flowchart showing corner coordinate detection processing.

In FIG. 3, the corner coordinate values of the black frame of a character field that is inferred at step 104 or at step 120, or the current row, is acquired (step 140). According to the example in FIG. 4, the inferred coordinate values $(X_0, Y_0)$ for the upper left corner of the black frame 312 are acquired.

Then, a Y coordinate detection area 300 (see FIG. 4) and an X coordinate detection area 302 (see FIG. 4) are set (step 142). The Y coordinate detection area 300 is a rectangle that is wide enough for a portion of the inferred top frame segment of the left black frame 312 to be fit in it, and that is high enough to accommodate the width of the top frame segment. The X coordinate detection area 302 is a rectangle that is high enough for a portion of the inferred left frame segment of the black frame 312 to be fit in it, and that is wide enough to accommodate the width of the left frame segment.

The horizontal projection is performed on the Y coordinate detection area 300 to prepare the vertical histogram (step 144). The vertical histogram is acquired by counting the number of pels in a horizontal line of the area (a line that consists of pels whose Y coordinates are identical) from the top side to the bottom side of the area. The vertical projection is performed on the X coordinate detection area 302 to prepare a horizontal histogram (step 144). The horizontal histogram is acquired by counting the number of pels on a vertical line (a line that consists of pels whose X coordinates are identical) in the area from the left side to the right side of the area.

Then, the vertical histogram is searched from the top to the bottom (step 146), and a check is performed to determine whether or not there is a point (whose Y coordinate is defined as $Y_1$) at which the number of pels corresponds to the horizontal width of the Y coordinate detection area 300 (step 148).

In the same manner, the horizontal histogram is searched from the left side to the right side (step 146), and a check is performed to determine whether or not there is a point (whose X coordinate is defined as $X_1$), at which the number of pels is equivalent to the height of the X coordinate detection area 302 (step 148).

Figure 4:
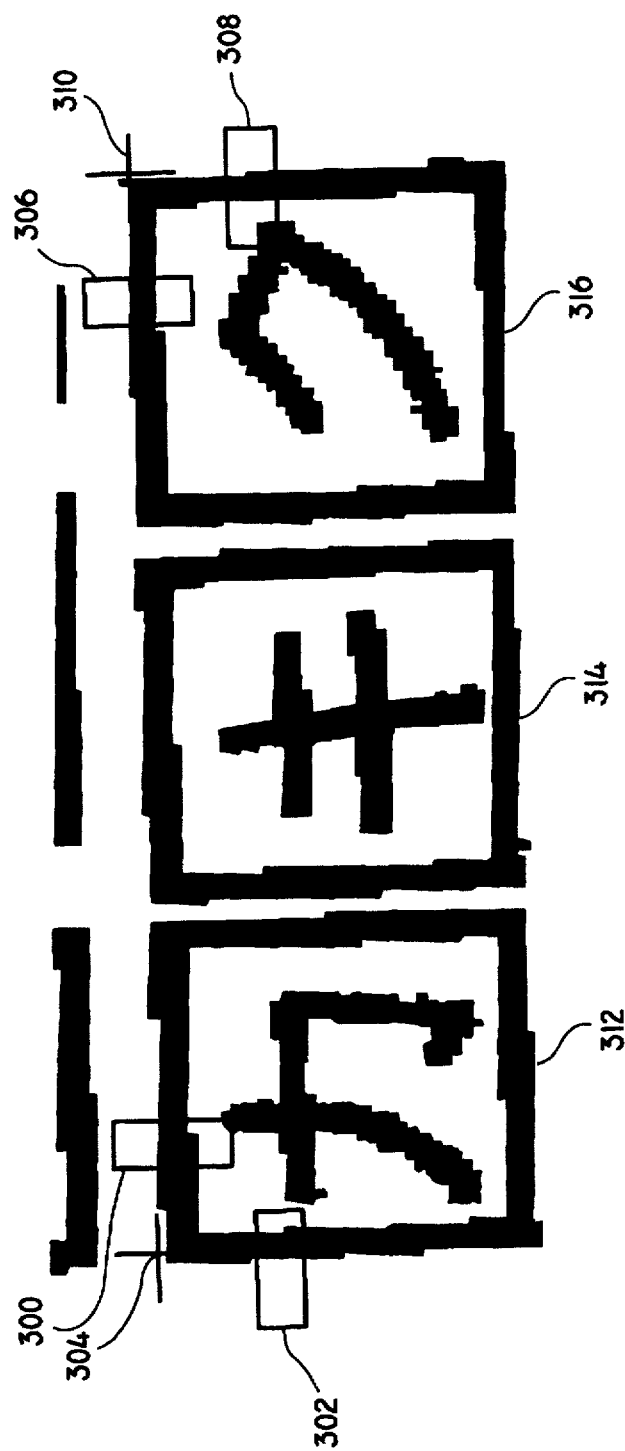
FIG. 4 is a diagram specifically showing the range for a detection area that is set in the corner coordinate detection processing.

A check at step 148 is continued until the search at step 146 is completed (the negative result at step 149). When there is a point at which the number of pels is equivalent to the horizontal length of the height of the detection area (the affirmative result at step 148), a check is performed to determine whether or not a point at which the number of pels is 0 is present within a predetermined distance before that detected point (step 150). In other words, a check is performed to determine whether or not there is an external area, of the black frame, where there are supposed to be no pels. When the point with no pels is detected (affirmative result at step 150), the point $Y_1$ that is detected at step 148 is determined to be the Y coordinate for the upper left corner and $X_1$ is determined to be the X coordinate for that corner (step 152). In FIG. 4, a point 304 corresponds to this point.

When no point is found within which there are no pels (negative result at step 150), outline tracing is performed to detect a corner that is curved at a right angle (step 151). When, as the result of tracing, the corner is detected (affirmative result at step 153), the coordinates $(X_2, Y_2)$ for the detected right angle corner are determined to be corner coordinates (step 155). When there is no corner detected as the result of the tracing (negative result at step 153), the inferred value $(X_0, Y_0)$ for the corner coordinates is employed as the corner coordinates (step 154).

When there is no point present at which the number of pels is equivalent to the horizontal length or the height of the detection area and the search has been completed (affirmative result at step 149), the outline tracing is also performed to detect a right angle corner (step 151). According to the detection result (step 153), the detection value $(X_2, Y_2)$ or the inferred value $(X_0, Y_0)$ is defined as the determined corner coordinates (step 154 or 155).

For the coordinates for the upper right corner, a Y coordinate detection area 306 and an X coordinate detection area 308 are set in a black frame 316, and the above process is performed to determine a point 310.

The inner wall detection process at step 108 in FIG. 2 will be explained in detail while referring to FIGS. 5 through 9. Since the inner wall detection method in this embodiment differs from that for the right and left inner walls and the upper and lower inner walls, an explanation for them will be given independently.

Figure 5:
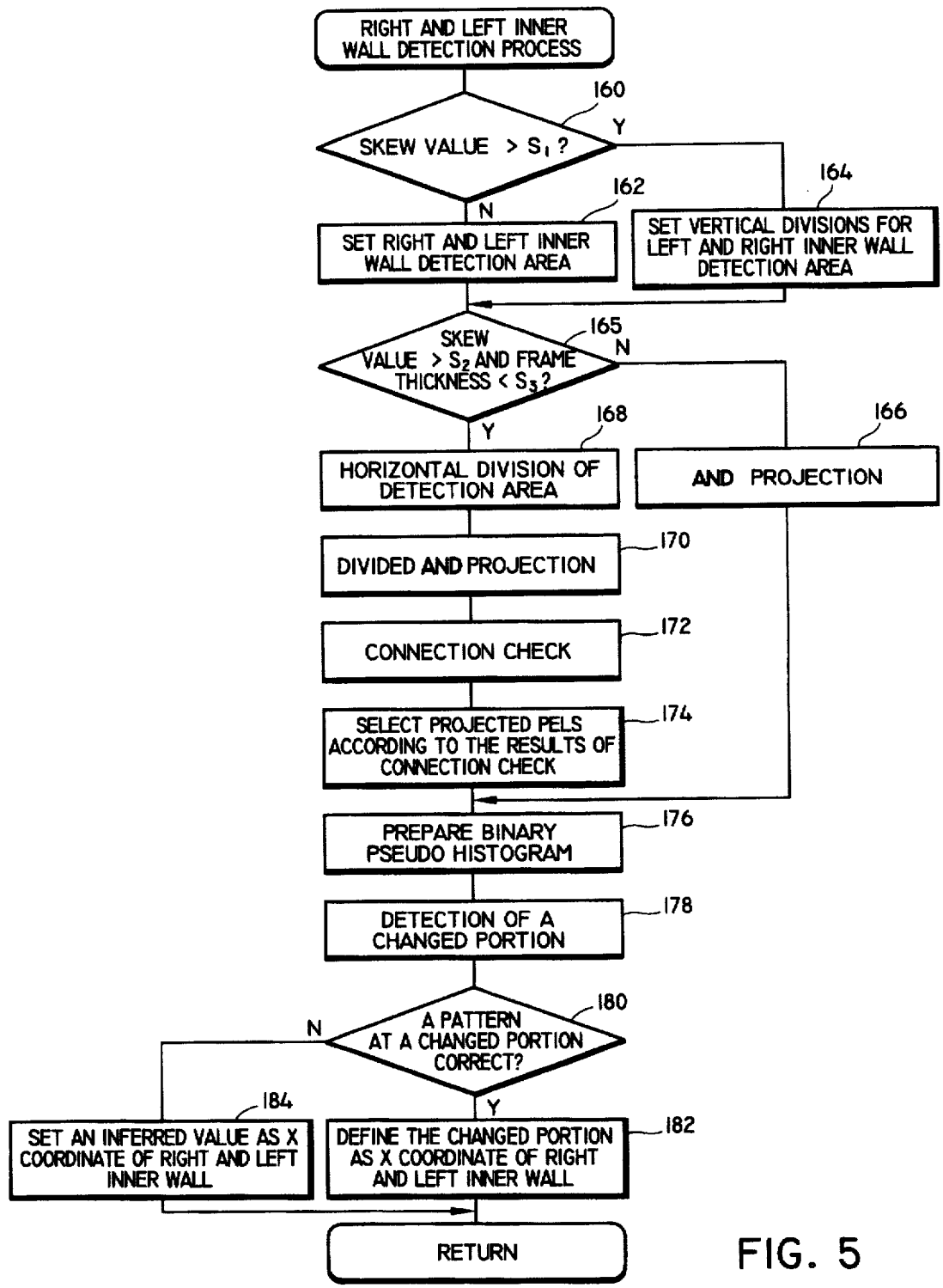
FIG. 5 is a flowchart showing the right and left inner walls detection processing.
Figure 6:
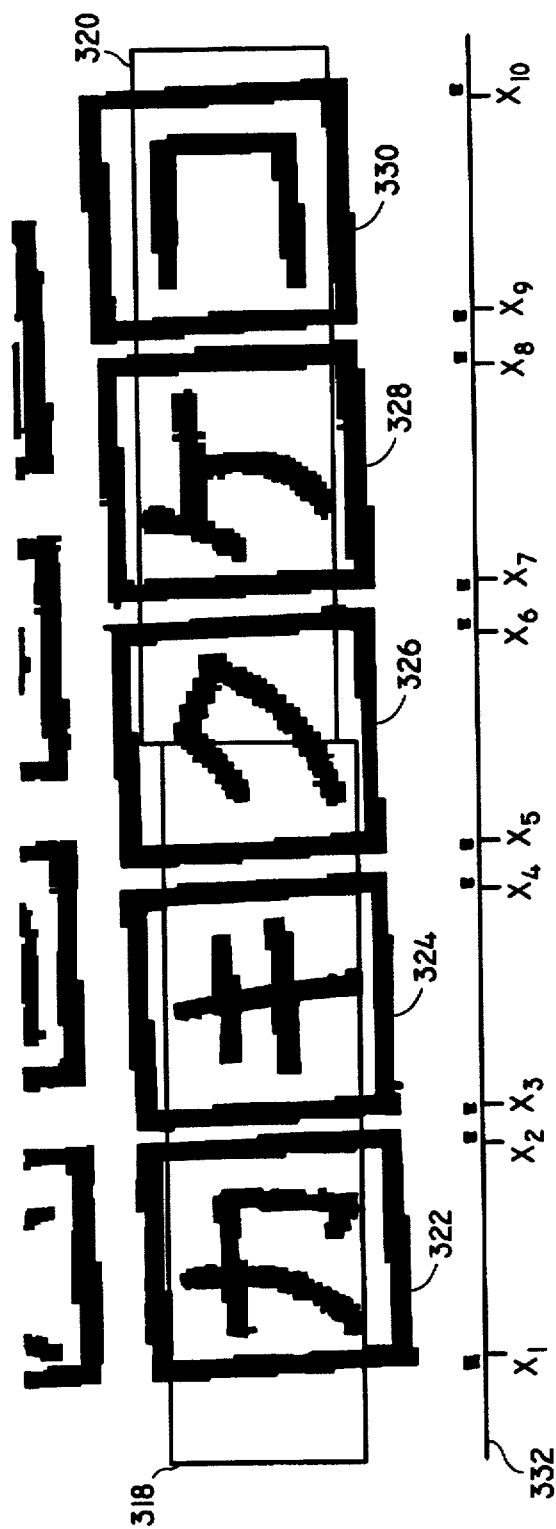
FIG. 6 is a specific diagram showing the range for a detection area that is set in the right and left inner wall detection processing, and a pseudo histogram.

First, the right and left inner wall detection process is shown in FIG. 5. A check is performed to determine whether or not the absolute value of a skew value that is calculated at step 106 in FIG. 2 has exceeded predetermined value $S_1$ (step 160). If the absolute value is not greater than $S_1$ (negative result at step 160), a single rectangle that has a horizontal base and a perpendicular altitude is set as a right and left inner wall detection area (step 162). The vertical height of the rectangle is shorter than that of the black frame (e.g., about 80% of the vertical height of the black frame), and the horizontal width is greater than that of the line, so that the rectangle is located at a position at which it is inferred that all the right and left frame segments of the black frame on this line are partly included, and that the upper and lower frame segments are not included. When the absolute skew value has exceeded the predetermined value $S_1$ (affirmative result at step 160), since a single rectangle might include the upper and lower frame segments, as is shown in FIG. 6, two separate right and left inner wall detection areas 318 and 320 are shifted by a step difference that is consonant with the skew value and are set in position (step 164). In the example in FIG. 6, the black frame is tilted upward to the right, and the area 320 is so located that in consonance with the direction of the tilt it is higher than the area 318. Thus, even if the skew value is great, the right and left inner wall detection areas are so set that they do not include the pels of the upper and the lower frame segments, and detection accuracy can be increased.

Although the detection area is divided into two sub areas in this embodiment, it may be divided into three or more, and may be divided by a variable count in consonance with the skew value.

Sequentially, a check is performed to determine whether or not the absolute skew value has exceeded a predetermined value S2 and whether or not the thickness of the frame is smaller than a predetermined value $S_3$ (step 165). If the result at step 165 is negative, it is assumed that the skew value is small or the frame is thick enough that the right and left frame segments can be detected by performing the AND projection. Thereafter, the AND projection is performed vertically by employing the detection areas (step 166), and the obtained result is stored as a binary pseudo-histogram in the memory (step 176). In the AND projection, a logic product is calculated in a predetermined direction while the coordinate at which pels are present is defined as 1 and the coordinate at which no pels are present is defined as 0, and the calculation result is employed as a projection result (0 or 1). In the projection at step 166, therefore, only when pels are continuously located in the vertical direction in the detection area are the right and left frame segments detected. In the example in FIG. 6, the black points that are present on a projection line 332 are pels that remain after the AND projection is performed on the black frames 322 through 330 in the detection areas 318 and 320.

Figure 7A:
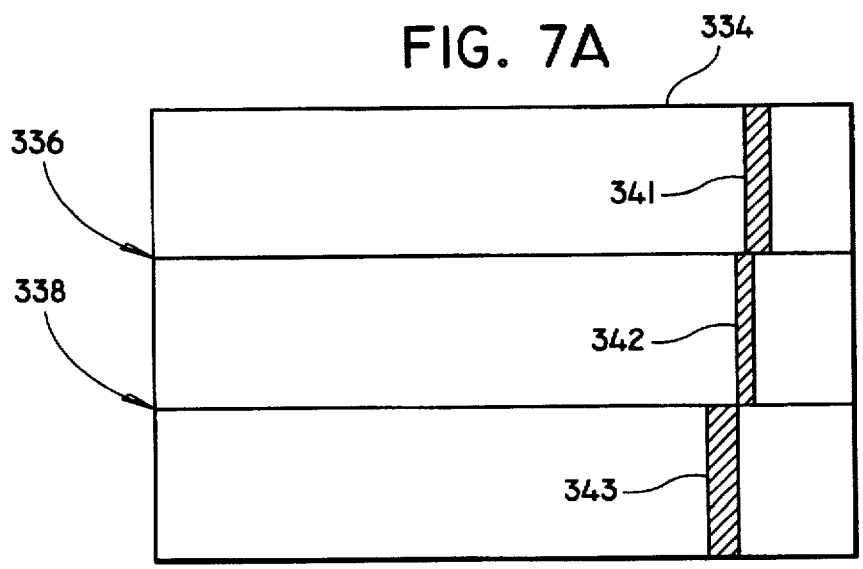
FIG. 7A is a diagram showing an example in which the detection area, which is set during the right and left inner wall detection processing, is divided into segments.

When the result obtained at step 165 is affirmative, it is assumed that the frame is not very thick while the skew value is large and the right and left frame segments can not be detected if the AND projection is directly performed. Thus, the detection area is divided into a plurality of sub areas in the horizontal direction (step 168). The example for the horizontally divided detection areas is shown in FIG. 7A. A detection area 334, which is set at step 162 or 164, is equally divided into three sub-areas along division lines 336 and 338, so that one right frame in this area is constituted by three portions 341, 342, and 343.

Figure 7B:
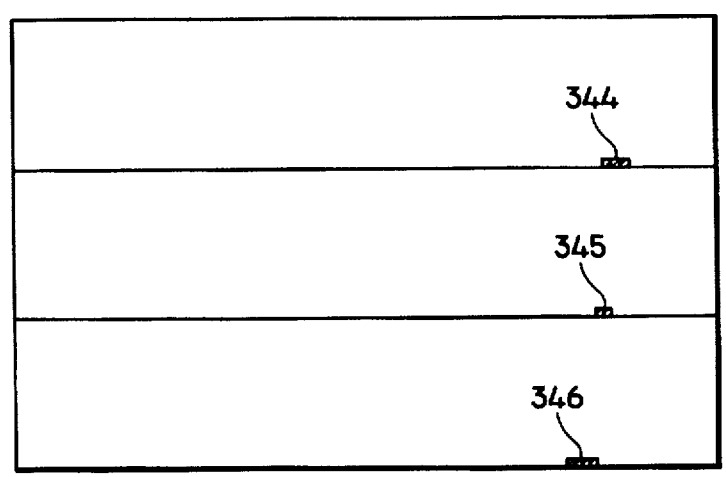
FIG. 7B is a diagram showing the result of the AND projection on the divided areas.

Divided AND projection is performed vertically on the divided areas (step 170). An example where the divided AND projection has been performed on the right frame in FIG. 7A is shown in FIG. 7B. As is apparent from FIG. 7B, the divided frames 341, 342, and 343 remain as projected pels 344, 345, and 346. In the right frame example where the skew value is large, as is shown in FIG. 7A, no projected pels remain if the detection area 334 is not divided and the AND projection is performed. Therefore, it is apparent that a method for performing an AND projection on each divided detection area is effective.

When the divided AND projection is completed for all the pels in the detection area, a check is performed to determine whether or not each of the projected pels that are obtained by the projection is connected to a projected pel in an adjacent divided area (step 172). By performing this process, the components of characters in the vertical direction or of noise can be prevented from being detected as a black frame.

According to the result of the examination of the connection, the selection of the projected pels is performed (step 174), and a binary pseudo-histogram is prepared (step 176). More specifically, only the projected pels that are determined to be connected among all the divided areas are extracted, and a binary pseudo-histogram is prepared, while the projected pels in the central divided area remain among the connected projected pels.

In the pseudo-histogram thus prepared, change points from white (0) to black (1) and black (1) to white (0) are detected (step 178). This detection is performed within a range of several pels near the right and left inner wall positions that are inferred at step 107 in FIG. 2. Through this process, highly effective processing can be realized.

Then, a check is performed to determine whether or not the pattern of the change position is correct (step 180). When the pattern of the change position is correct (affirmative result at step 180), the change position is detected as the X coordinate for the right and left inner walls (step 182). In the example in FIG. 6, the X coordinate for the right and left inner walls of the black frames 322 through 330 is determined as $X_1$ through $X_{10}$. When the pattern at the change position is not correct (negative result at step 180), the inferred value at step 107 is employed as the X coordinate for the right and left inner walls. The smoothing process (step 110 in FIG. 2) is performed for the detected positions of the right and left inner walls.

The right and left inner wall detection processing has been explained. The connection checking process at step 172 will now be explained in detail by employing a specific example in FIG. 9 while referring to FIG. 8. FIGS. 9A and 9B show examples of the connection of the divided frames 341, 342, and 343 that are shown in FIG. 7A, and FIG. 9C shows an example of disconnected divided frames.

Figure 8:
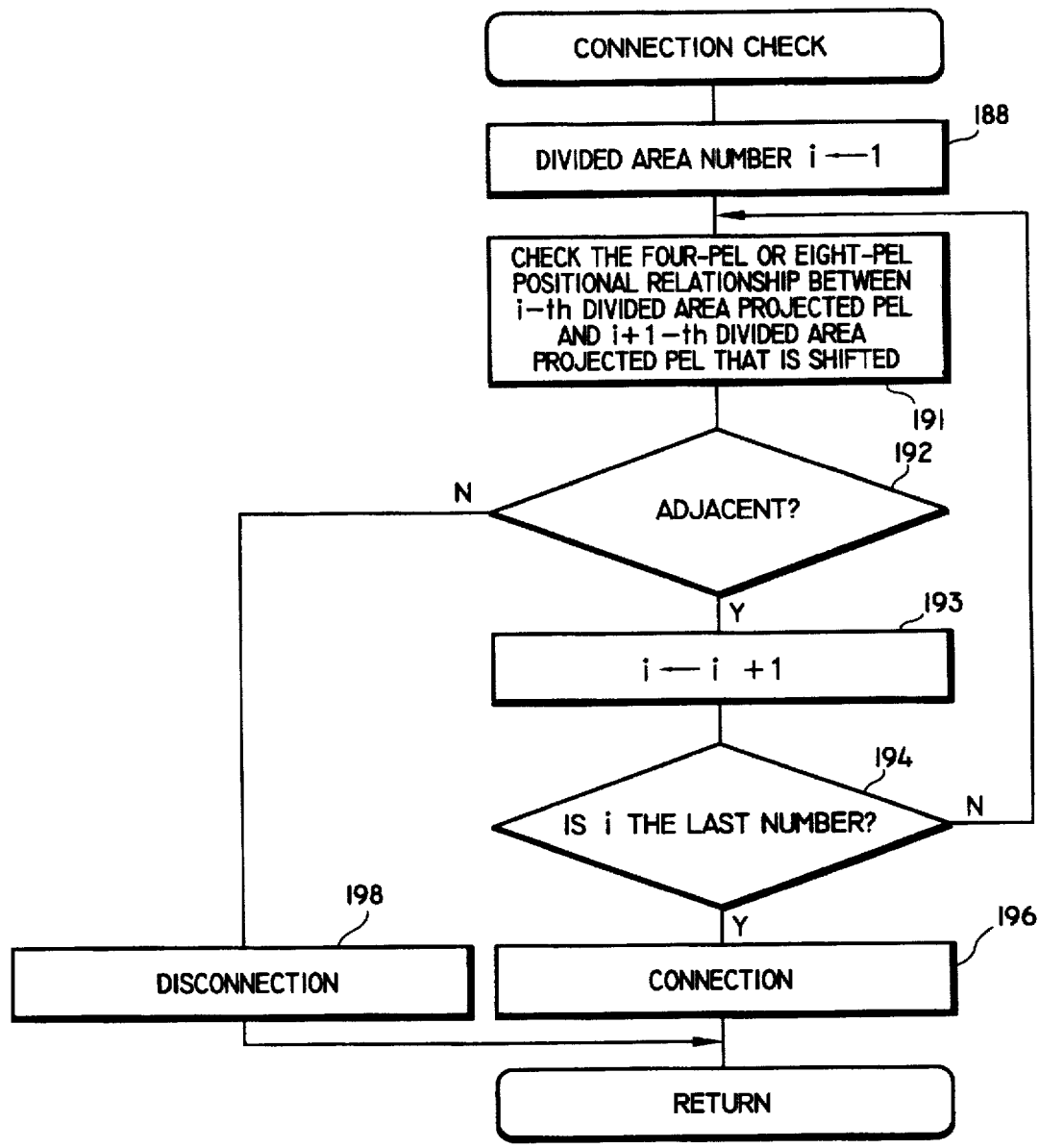
FIG. 8 is a flowchart showing connection check processing.
Figure 9A:
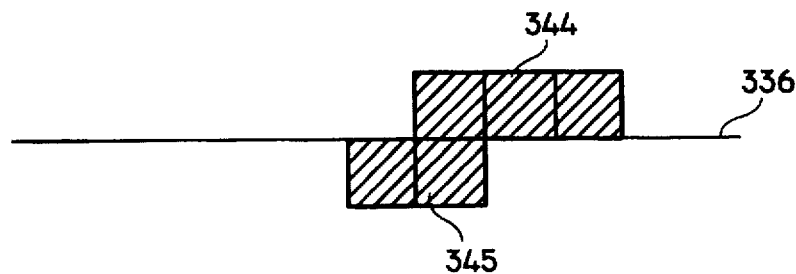
FIGS. 9A and 9B are diagrams showing the positional relationship for the AND projection of the two connected divided frames.
Figure 9B:
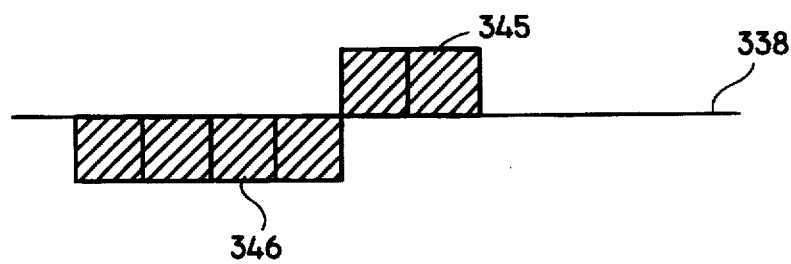
Figure 9C:
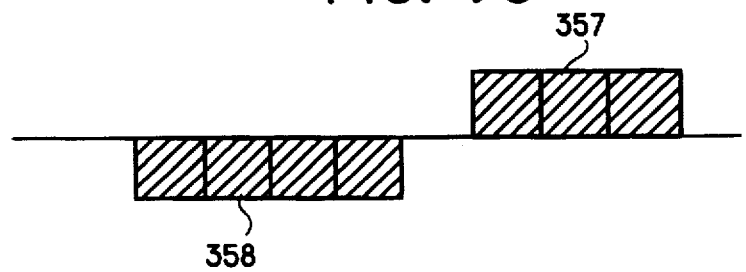
FIG. 9C is a diagram showing the positional relationship for the AND projection of the two non-connected divided frames.

In the flowchart in FIG. 8, first, "1" is substituted into the divided area number i (step 188). Then, the four-connection or eight-connection positional relationship between the projected pels in i-th divided area and the projected pels in the i+1-th divided area is examined (step 191). The procedures at step 191 will be explained by employing the projected pels in FIG. 7B while referring to FIG. 9A. FIG. 9A shows an example of a positional relationship between the projected pels 345 in the second divided area and the projected pels 344 in the first divided area. As is apparent, the right black pel of the projected pels 345 is adjacent to the left black pel of the projected pels 344 thus forming a four-way juncture. In this example, therefore, the projected pels 344 and 345 are adjacent to each other.

When the pels are adjacent to each other (affirmative result at step 192), the divided area number i is incremented by "1", and a check is performed to determine whether or not the resultant area number i is the last divided area number (step 194). Since the area number i is currently "2", program control returns to step 190 (negative result at step 194), and the same process is repeated. In FIG. 7B, the positional relationship between the projected pels 345 and 346 is examined. This case is shown in FIG. 9B. The left black pel of the projected pels 345 is adjacent to the right black pel of the projected pels 346 thus forming an eight-way juncture. All the projected pels in FIG. 7B are therefore adjacent to each other (affirmative result at step 194), and the obtained result is set as "connected" (step 196). Program control thereafter returns.

If the projected pels are not adjacent to each other (negative result at step 192), the obtained result is set as "not connected" (step 198) and program control returns. In other words, even when only one pair of the projected pels is not adjacent to each other, it is assumed that the projected pels are not connected. The pair of the projected pels that is not adjacent to each other is shown in FIG. 9C. According to this example, the left black pel of projected pels 357 and the right black pel of projected pels 358 form neither a four-way juncture nor an eight-way juncture, and are not adjacent to each other.

Figure 10:
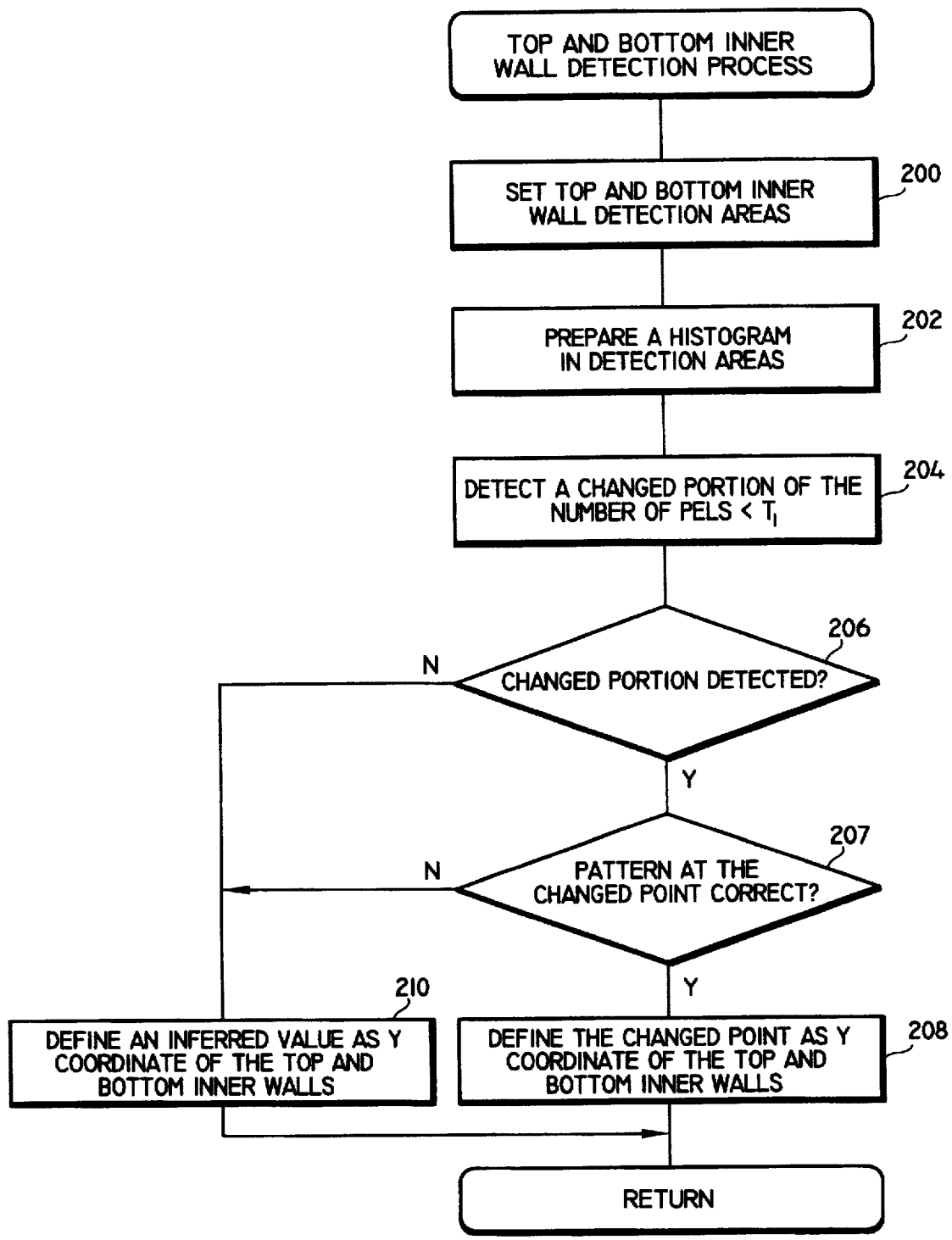
FIG. 10 is a flowchart showing the up and down inner wall detection processing.
Figure 11:
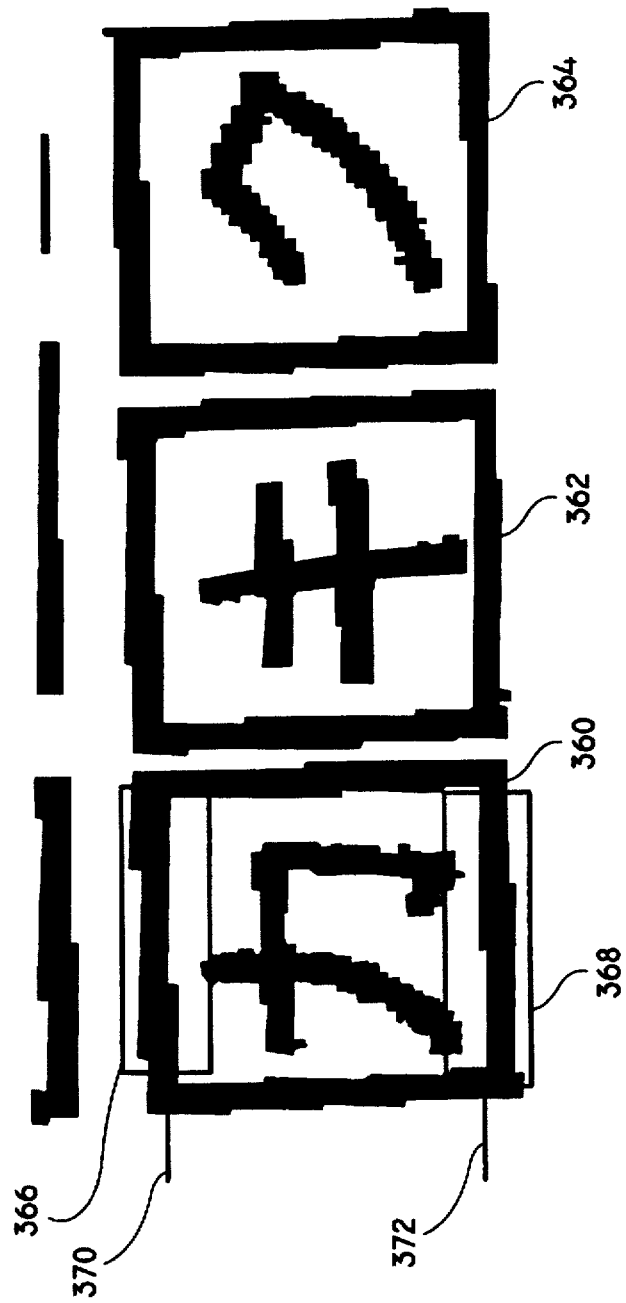
FIG. 11 is a specific diagram illustrating the range of a detection area that is set during the up and down inner wall processing.

The upper and lower inner wall detection process will now be described while referring to FIG. 10. In FIG. 10, in order to acquire more accurate positions for the upper and lower inner walls than their inferred values, first, upper and lower inner wall detection areas are set in a range for actually scanning an image (step 200). FIG. 11 is a diagram showing an example where the upper and lower inner wall detection areas are set. In the example in FIG. 11, a rectangular upper detection area 366 and a rectangular lower detection area 368 are provided in ranges that respectively cover most of an upper frame segment and a lower frame segment of a black frame 364. The vertical length of this rectangular is set larger than the defined value of the thickness of the character frame (e.g., 10 to 12 pels with a resolution of 8/mm), and the horizontal length is set within a distance between the right and left inner walls that is acquired by the right and left inner detection process. The positions for the right and left inner walls that are obtained after the smoothing process are employed in this process.

A histogram is prepared by performing a horizontal projection on the pels in the detection areas (step 202). At this time, image data for one line in the detection area is divided into bytes. Then, the number of black pels is calculated for each byte (equivalent to eight pels) and the number of black pels that is acquired for each byte are added to provide the total black pels on this line. In this manner, the time required for counting the number of pels can be substantially reduced.

The histogram is then searched in the vertical direction to detect a change position at which the number of pels is smaller than a predetermined threshold value $T_1$ (step 204).

When such a change position is detected (affirmative result at step 206) and when the pattern at the change position is correct (affirmative result at step 207), the Y coordinate for the change position is defined as the Y coordinate for the upper and lower inner walls (step 208). When no change position is detected (negative result at step 206), or when the pattern of a detected change position is not correct (negative result at step 207), the Y coordinate for the upper and lower inner walls that is acquired during the inner wall inferring process is defined as a detected value (step 210). In the example in FIG. 11, the upper inner wall and the lower inner wall of the black frame 360 are detected as line segments that respectively have Y coordinates 370 and 372.

The above described process is performed also for the other black frames 362 and 364 on the same line, and the upper and lower inner wall detection process is terminated. The smoothing process (step 110 in FIG. 2) is performed on the detected positions for the upper and lower inner walls.

Figure 12:
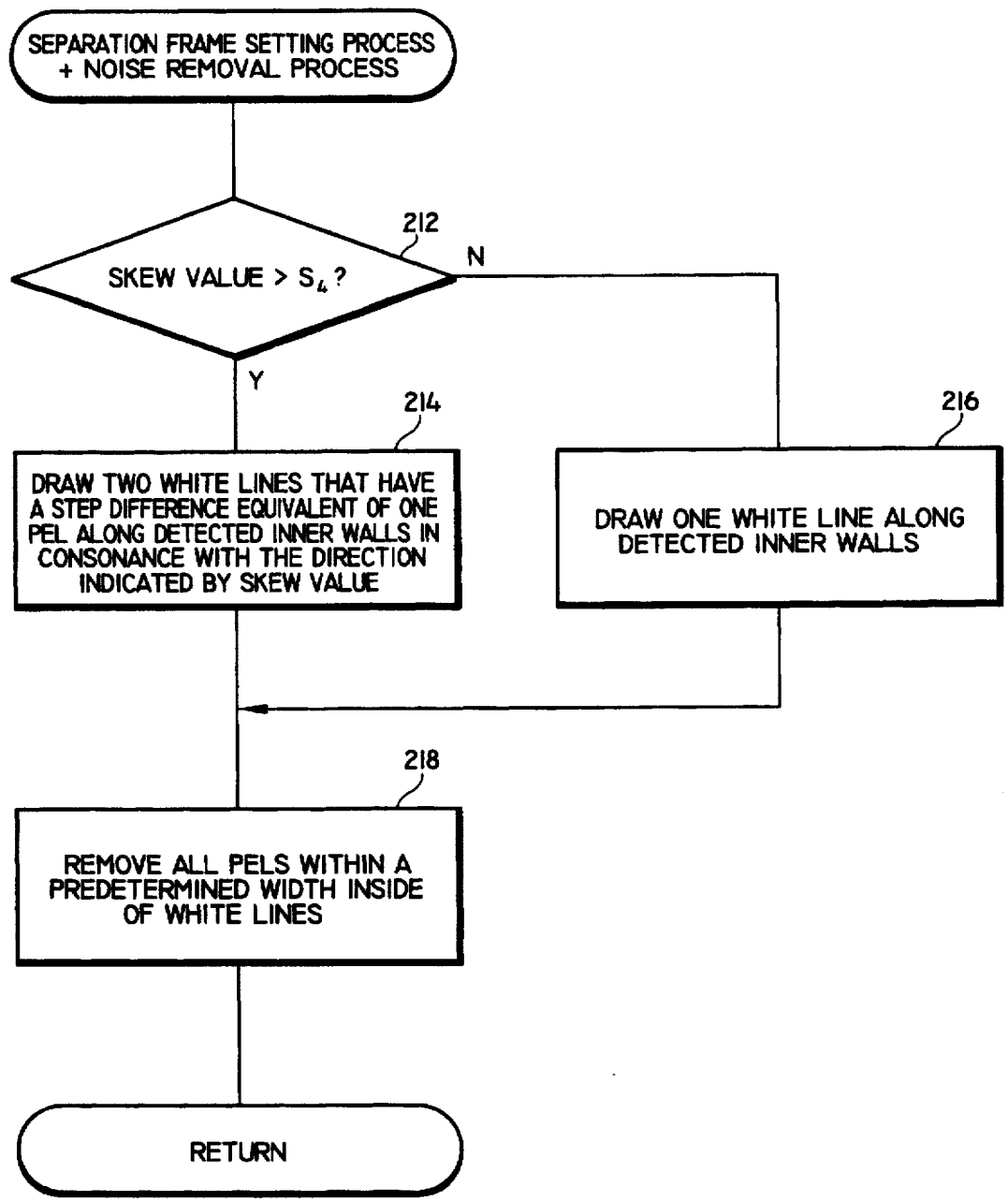
FIG. 12 is a flow chart showing separation frame setting processing and noise removing processing.

The separation frame setting processing and the noise removal processing will be described in detail while referring to FIG. 12.

First, a check is performed to determine whether or not the absolute skew value has exceeded a predetermined threshold value $S_4$ (step 212).

When, as the result, it is found that the absolute skew value has not yet exceeded the threshold value (negative result at step 212), a single white line of a predetermined width is written along the detected four inner side walls (the approximate sides of rectangles) (step 216). This process corresponds to the process where, for image data that are stored in the image memory 20, the values of pels in an area of the white line are changed to 0. When the image data have a gray scale level that is greater than a binary value, the area of the white line may be drawn to image data that have a different density from that of the image data or that have a single color phase.

When the absolute skew value has exceeded the threshold value $S_4$ (affirmative result at step 212), in consonance with the skew direction, two white lines of an equal length and a predetermined width, which are connected to provide a step difference in between, are drawn along the detected four inner side walls (step 214).

FIG. 13 shows an example of an image for explaining the process at step 214. In FIG. 13A, in which is shown an image for which white line drawing process is performed, the characters and the black frames contact each other. In FIG. 13B is shown an image example obtained after the process at step 214 is performed on the image in FIG. 13A. As is apparent from the image in FIG. 13B, the characters and the black frames are clearly separated from each other, compared with those in the image in FIG. 13A.

Since the image in FIG. 13 is skewed upward to the left, two white lines are also connected along the direction. In FIG. 13C is shown how the two white lines are connected. A white line 400 that is drawn along the upper frame inner wall is connected so that the right white line segment is located lower than the left white line segment. White lines 402, 404 and 406 that are drawn along the other inner walls are so connected that there is a step difference in the direction of the skew.

Figure 13A:
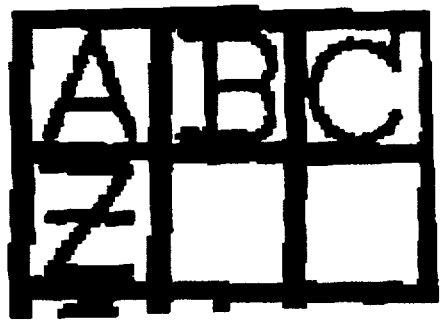
FIG. 13A is a diagram showing an image example of a black frame and a character that contacts it.
Figure 13B:
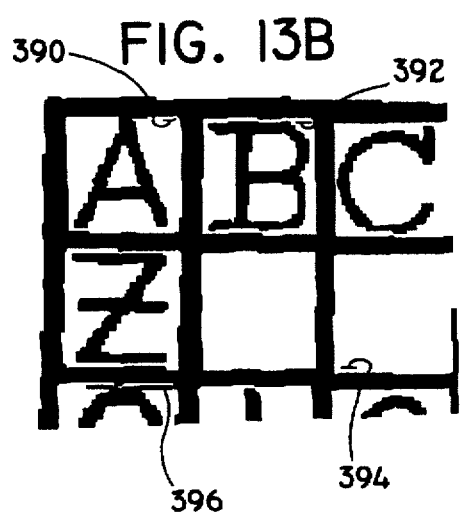
FIG. 13B is a diagram showing an image example obtained after the separation frame setting processing is performed on the image in FIG. 13A.
Figure 13C:
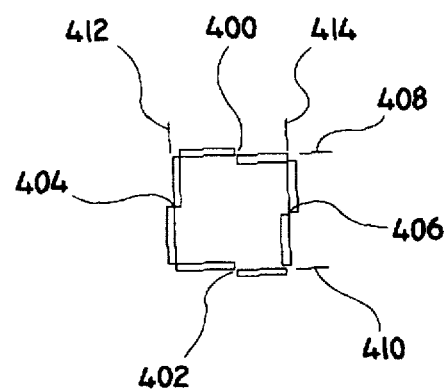
FIG. 13C is a diagram showing two white lines having a step difference that are set along the four inner side walls during the separation frame setting process.

In the example shown in FIG. 13C, the white lines are so arranged that the four inner walls are located at positions 408, 410, 412 and 414. The width of the white lines and the step difference are set so that they are the equivalent of one pel. If the resolution is 8/mm and the thickness of the character frame and the skew value are those shown in this example, it seems most appropriate that two white lines having a width of one pel and having an equal length be connected to provide a step difference of one pel.

Figure 13D:
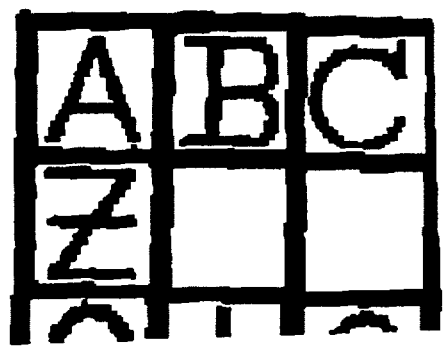
FIG. 13D is a diagram showing an image example obtained after noise removal processing is performed on an image shown in FIG. 13B.

After the white line drawing processing is completed, black frame pieces, such as noise 390, 392, 394 and 396 shown in FIG. 13B, still remain. Therefore, processing for removing the noise is performed to erase all the black pels that exist within a given inside width beginning at the white lines (step 218). In FIG. 13D is shown an image obtained after the noise in FIG. 13B is removed. All the noise that is present in FIG. 13B is removed in FIG. 13D.

Since only black pels that represent characters remain inside the black frame following the performance of the separation frame setting and the noise removal, a discernible image that is close to an original image can be provided. The characters with the black frame can be employed for confirmation of the processing result during the separation process, and can also be used as an image for the correction of a recognition error. Therefore, only one image data set is required and memory space savings is possible. Further, this resultant image can be transmitted to a conventional step for detecting a rectangle that externally contacts the character.

Although a character recognition apparatus according to the embodiment has been explained, the apparatus is not limited to the above embodiment. In this embodiment, the processes that concern image separation are performed under the control of the CPU 16, but the present invention can be realized by providing a dedicated circuit that performs these processes. Especially, a device that performs image separation according to the embodiment can be independently used as a board that can be inserted into the character recognition apparatus, or as a device that can be connected to the character recognition apparatus.

In the corner detection process, the outline tracing at step 151 may be performed from the beginning. When there is no character frame layout parameter, a method for searching for a black line in image data may be added.

The upper right and left corner coordinates are calculated in order to specify positions of a character field and of a black frame for the second line and thereafter. As long as these positions are specified, the lower right and left corner, the center of the black frame, or other points may be employed to calculate coordinates.

In the right and left inner wall detection processing, a binary pseudo-histogram is prepared, and in the upper and lower inner wall detection processing, a common histogram is prepared by counting the number of pels. In the latter processing, a binary pseudo-histogram can be employed. In this case, it goes without saying that a method for dividing a detection area in consonance with a skew value can be applied.

The setting range for the detection areas, the division of the detection area, and the processing flow can be varied appropriately within the scope of the effect that is provided by the present invention.

As is described above, according to the invention, since appropriate partial ranges are determined from the inferred values obtained by the parameter relative to the character frame, and the scanning is performed only in these ranges, while a simple algorithm is employed, the detection accuracy is not degraded and the required processing time can be substantially shortened.

According to the invention, since the smoothing means is additionally provided, noise and influence on character portions are reduced, and the detection of the positions of the inner walls is highly accurate.

According to the invention, since the detected inner wall positions are employed as reference data to set a data separation frame, even when a character contacts a character frame, the character can be precisely separated from the character frame.

According to the invention, an approximation process is performed with the data separation frame, in consonance with the obtained skew value, by using two line segments of a given length. Therefore, even when a skew value is great, image can be separated from the character frame.

According to the invention, since the noise removal means is additionally provided, there is slight possibility that part of the character frame will be separated as a character portion, and the separation can be performed accurately.

According to the invention, since the ranges that are set can be varied in consonance with the obtained skew value, the deterioration, due to a skew, of the accuracy for the inner wall detection can be avoided.

According to the invention, since the inference process that uses a parameter relative to a character frame and the scanning of a partial range are appropriately combined and performed for the detection of corner coordinates, the position of a character frame can be more precisely detected.

According to the invention, since the corner coordinates for each line are inferred by using the corner coordinates for the immediately preceding line, even when there is a non-linear skew whose value differs for each line, accurate corner coordinates can be detected for each line.

According to the invention, fast processing and the maintenance of high accuracy can be achieved at the same time by appropriately combining and performing the AND projection and the detection of a change point.

According to the invention, a scanning range is divided in consonance with a skew value and the connection of divided frame segments is examined after the AND projection is performed. As a result, even when a skew value is large, fast processing can be performed and detection accuracy can be prevented from being degraded.

According to the invention, since an image separation apparatus of the present invention is employed for a character recognition section, a character recognition section can be provided which can recognize the characters very precisely, while processing speed as a whole is almost unchanged when compared with conventional speed, even during the recognition of a character in a black frame.

According to the invention, since the display means is additionally provided to display an image in which character frames and characters are precisely separated from each other, one image can serve as display data and as separation data, and memory can be saved.

I claim:

1. An image segmentation apparatus comprising:
   input means for inputting digital image data that include data for a character frame;
   parameter acquisition means for acquiring a parameter relative to said character frame;
   position detection means for detecting a position of said character frame in an image;
   inner wall inferring means for inferring positions of inner walls on four sides of said character frame by employing said position of said character frame, which is detected by said position detection means, and said parameter of said character frame;
   range setting means for inferring ranges for each frame segment of four sides that constitutes said character frame, and for setting partial ranges that overlap said inferred ranges by employing said positions of said inner walls of said character frame, which are inferred by said inner wall inferring means, and said parameter of said character frame; inner wall detection means for acquiring pel distribution for each of said partial ranges by actually scanning pels in said partial ranges that are determined by said range setting means, and for detecting positions of said inner walls of said character frames by employing said pel distribution; and
   separation means for separating said character frame and image data within said character frame by employing said positions of said inner walls, which are detected by said inner wall detection means.

2. The image segmentation apparatus according to claim 1, further comprising smoothing means for smoothing said positions of said inner walls of said character frame, which are detected by said inner wall detection means, by employing said positions of said inner walls and positions of inner walls that are detected for another character frame that is adjacent to said character frame.

3. The image segmentation apparatus according to claim 1, wherein said separation means employs, as a reference, said positions of said inner walls to set a data separation frame of a predetermined width along said inner walls, and separation frame setting means rewrites image data within said data separation frame to prepare image data with a different density or in a single color phase.

4. The image separation apparatus according to claim 3, wherein said separation frame setting means employs two line segments of a predetermined width, which are so connected as to have a given step difference, in order to approximate said data separation frame in consonance with an obtained skew value.

5. The image segmentation apparatus according to claim 3, further comprising noise removal means for removing, from said data separation frame, black pels that are retained in an inwardly extended predetermined width.

6. The image segmentation apparatus according to claim 4, wherein said range setting means varies said ranges in consonance with said obtained skew value.

7. The image segmentation apparatus according to claim 1, wherein said position detection means includes:
   corner coordinate inferring means for employing said parameter relative to said character frame to infer coordinates for a corner on a row of said character frame; and corner coordinate determination means for determining, near said coordinates that are inferred by said corner coordinate inferring means, each partial range that partly includes a horizontal frame segment or a vertical frame segment that constitutes said character frame in said row, for employing pel distribution in a range including said horizontal frame segment to determine a Y coordinate for said corner on said row, and for employing pel distribution in a range including said vertical frame segment to determine an X coordinate for said corner on said row.

8. The image segmentation apparatus according to claim 7, wherein, in an identical character field, said corner coordinate inferring means employs said parameter of said character frame to infer a corner coordinates for said first line of said character frame, and employs said parameter relative to said character frame and corner coordinates that is detected for a line immediately before in order to infer corner coordinates for a second line and succeeding lines.

9. The image segmentation apparatus according to claim 1, wherein said inner wall detection means includes:

pseudo histogram preparation means, for calculating a logic product for pel values horizontally or vertically in said range, to prepare a binary pseudo histogram where vertically or horizontally an AND projection is performed on said pels in said range; and change detection means for detecting change points, for said pseudo histogram in a range near said positions of said inner walls that are inferred by said inner wall inferring means, and coordinates for said change points, which are detected by said change detection means, that are employed as coordinates for said inner walls of said character frame.

10. The image segmentation apparatus according to claim 9, wherein said pseudo histogram preparation means includes:

dividing and projecting means, for, in consonance with said obtained skew value, dividing said range into a plurality of areas in a direction perpendicular to a direction for searching and acquiring an AND projection for each of divided areas, and connection determination means, for connecting divided frame segments by employing a positional relationship of black pels that is obtained by said AND projection; and wherein a pseudo histogram is prepared only by employing a result of said AND projection for a frame for which said connection determination means determines said frame segments are connected.

11. A character recognition apparatus for recognizing image data for a character frame that are separated by the image segmentation apparatus according to claim 1.

12. The character recognition apparatus according to claim 11, further comprising display means for displaying said character frame and image data within an internal area of said character frame.

* * * * *